United States Patent [19]
Haegeman

[11] Patent Number: 5,980,100
[45] Date of Patent: Nov. 9, 1999

[54] APPARATUS FOR TREATING LIQUIDS

[75] Inventor: Johny Hector Haegeman, Halle, Belgium

[73] Assignee: Aquasystems International N.V., Bulgaria

[21] Appl. No.: 09/029,320

[22] PCT Filed: Sep. 25, 1996

[86] PCT No.: PCT/BE96/00099

§ 371 Date: Feb. 26, 1998

§ 102(e) Date: Feb. 26, 1998

[87] PCT Pub. No.: WO97/11772

PCT Pub. Date: Apr. 3, 1997

[30]     Foreign Application Priority Data

Sep. 27, 1995 [BE] Belgium ................................ 09500798

[51] Int. Cl.⁶ ................................ B01F 5/12; C10J 1/08
[52] U.S. Cl. ............................ 366/262; 261/91; 261/120
[58] Field of Search .................................. 366/270, 262, 366/263, 102, 261; 261/83, 84, 120, 91, 119.1

[56]              References Cited

U.S. PATENT DOCUMENTS

| | | | |
|---|---|---|---|
| 3,810,548 | 5/1974 | Blough | 261/120 |
| 3,846,516 | 11/1974 | Carlson | 366/120 |
| 3,856,272 | 12/1974 | Ravitts | 366/261 |
| 3,887,660 | 6/1975 | Romantschuk et al. | 261/120 |
| 4,089,620 | 5/1978 | Ravitts | 366/270 |
| 4,468,358 | 8/1984 | Haegeman . | |
| 4,482,510 | 11/1984 | Khudenko | 261/120 |
| 4,540,528 | 9/1985 | Haegeman . | |
| 4,733,972 | 3/1988 | Weis | 366/270 |
| 4,734,235 | 3/1988 | Holyoak | 261/120 |
| 5,021,154 | 6/1991 | Haegeman . | |
| 5,275,762 | 1/1994 | Burgess | 261/120 |
| 5,336,399 | 8/1994 | Kajisono | 366/102 |
| 5,676,889 | 10/1997 | Belgin | 261/93 |

FOREIGN PATENT DOCUMENTS

| | | |
|---|---|---|
| 841825 | 9/1976 | Belgium . |
| 514506 | 10/1971 | Switzerland . |

*Primary Examiner*—Tony G. Soohoo
*Attorney, Agent, or Firm*—Hall, Priddy & Myers

[57]              ABSTRACT

The apparatus comprises a motor (16) which is mounted on a float and in which the motor drives an impeller device (20) which extends below the liquid surface (11), with the motor (16) being mounted in a chamber (12) which is fully sealed from the liquid and which serves as a float (10). The apparatus may be fitted with a supply conduit (30) in order to bring gas, such as air, from above the liquid surface to the vicinity of the impeller device (20). The apparatus may be used for the treatment, mixing and/or aeration of liquids such as for example waste water.

11 Claims, 3 Drawing Sheets

APPARATUS FOR TREATING LIQUIDS

BACKGROUND OF THE INVENTION

The invention relates to an apparatus for treating liquids and more specifically for mixing and/or aerating liquids, such as for example waste water.

Apparatuses of this type mainly comprise a power source such as a motor—which is mounted on a float and in which the power source drives an impeller device—such as a screw-shaped body—which is located at least partly beneath the surface of the liquid.

Floating mixers or aerators are generally known for treating waste water. Apparatuses of this kind are described in Belgian patents BE 884.216 and BE 893.687 in the Applicant's name.

One embodiment in which a single apparatus can be used as aerator and as mixer is described in Belgian patent 1.002.575. Mixing or aeration is carried out with this apparatus depending on the direction of rotation of the motor and thus of the screw. Thus, with one direction of rotation, the screw is made to axially pump the water upwards from below, after which the water is dispersed over the water surface at great speed. If the direction of rotation of the motor is reversed, the effect is obtained that the screw radially draws in the water from near the surface of the water and then pushes it axially downwards. In order to change over from aeration mode to mixing mode, the float is fitted with means for adjusting the immersion level of the apparatus.

During use of such apparatuses in liquids and also in contaminated water, it has been found that foam formation may take place at the surface of the liquid. This foam formation may lead to the motor or power source becoming defective if the foam builds up around it.

SUMMARY OF THE INVENTION

The object of the invention is to propose an apparatus for the mixing and/or aeration of liquids (waste water or other liquids) in which the power source (for example a motor, a motor reducer, etc.) is protected in an efficient manner against adverse external influences.

According to the invention, the power source is to this end mounted in a closed chamber, with said chamber also acting as a float, and said chamber contributes substantially to the buoyancy of the apparatus. In this way, foam formation and any atmospheric conditions are prevented from adversely affecting the power source and a more stable unit is at the same time obtained in which the centre of gravity of the apparatus is appreciably lowered. The construction of the apparatus also becomes more compact and simpler.

According to an embodiment of an apparatus according to the invention, the power source is centrally built into the float according to an axis perpendicular to the surface of the water.

According to another embodiment, the power source may be arranged with the impeller device at an angle with the surface of the water.

If the apparatus is to be used as an aerator, an air chamber may be fitted at the bottom of the float and around the top of the impeller device; said air chamber is connected to the atmosphere via a conduit provided for this purpose. The air can be drawn in via said conduit by the suction effect of the impeller device and further mixed with the liquid and pushed down. Other points for introducing air are also possible, such as for example addition of air at the underside of the impeller device. The air can be introduced by natural aspiration but can also be added in a forced manner (for example under pressure).

According to yet another embodiment of the invention, the power source may be arranged vertically and drive an impeller device which pumps the liquid upwards and hurls it over the surface in order to aerate it in this way.

An embodiment is also possible in which the power source drives an impeller device which also acts as a float.

The apparatus is normally manufactured from steel and preferably from stainless steel, although it is also possible to use other materials such as for example reinforced plastics and the like.

BRIEF DESCRIPTION OF THE DRAWINGS

Further details and characteristics will be apparent from the following description of a few non-limitative embodiments of the invention with reference to the appended drawings in which.

DETAILED DESCRIPTION

Figure 1:
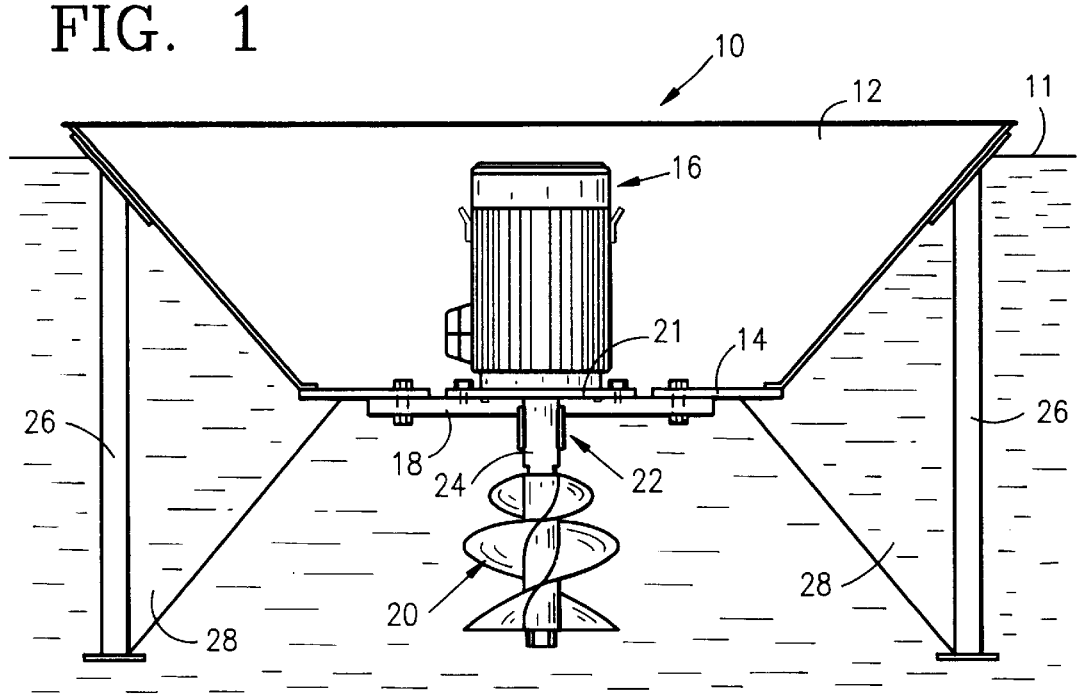
FIG. 1 is a cross section of a mixer according to the invention in which a motor is arranged centrally and vertically.

A float 10 is illustrated in FIG. 1 which forms a sealed air chamber 12 with a cross section in the form of an upside-down trapezium which floats on a water surface 11.

A motor 16 is mounted on the base plane 14 of this chamber 12 by means of a flange 18. A screw-shaped body 20 which is entirely located in the water is mounted on the shaft of the motor. An oil pan 21 with a seal 22 is located between the motor 16 and the flange 18. This seal 22, which is preferably a sliding ring seal, provides the separation between the oil pan 21 and the water and is thus cooled and lubricated along both sides. Sealing of air chamber 12 is in this example effected on the cylindrical part 24 of screw-shaped body 20.

The screw-shaped body 20 is based on impeller technology as described in the Applicant's Belgian patents already mentioned above.

The motor 16 is thus on the one hand protected by the air chamber 12 of the float 10 and on the other hand by a mechanical seal 22, in this example an oil pan 21 and the standard seal of the motor. If desired, it is additionally possible to provide moisture detection with a suitable alarm installation both inside the float 10 and inside the oil pan 21.

The waste water which is in contact with a large part of the float 10 provides normal cooling of the motor. The heat-exchanging wall is dimensioned for the "warmest" waste waters, according to generally applicable standards, taking into account also the buoyancy of the float 10. If, for specific applications, a balance cannot be found between heat-exchanging capacity and buoyancy, the air chamber 12 may be fitted with cooling fins.

Since both a vertical and an inclined arrangement of the motor 16 is possible, the form of the float 10 should be adapted to suit the stability of the arrangement.

In a practical embodiment as illustrated in FIG. 1, the float 10 is fitted on the outer circumference with legs 26 in order to support the apparatus when it is not in water.

The float is preferably also fitted with water orientation plates 28 whose function is to ensure efficient flow and/or rotation of the waste water in the basin.

Figure 2:
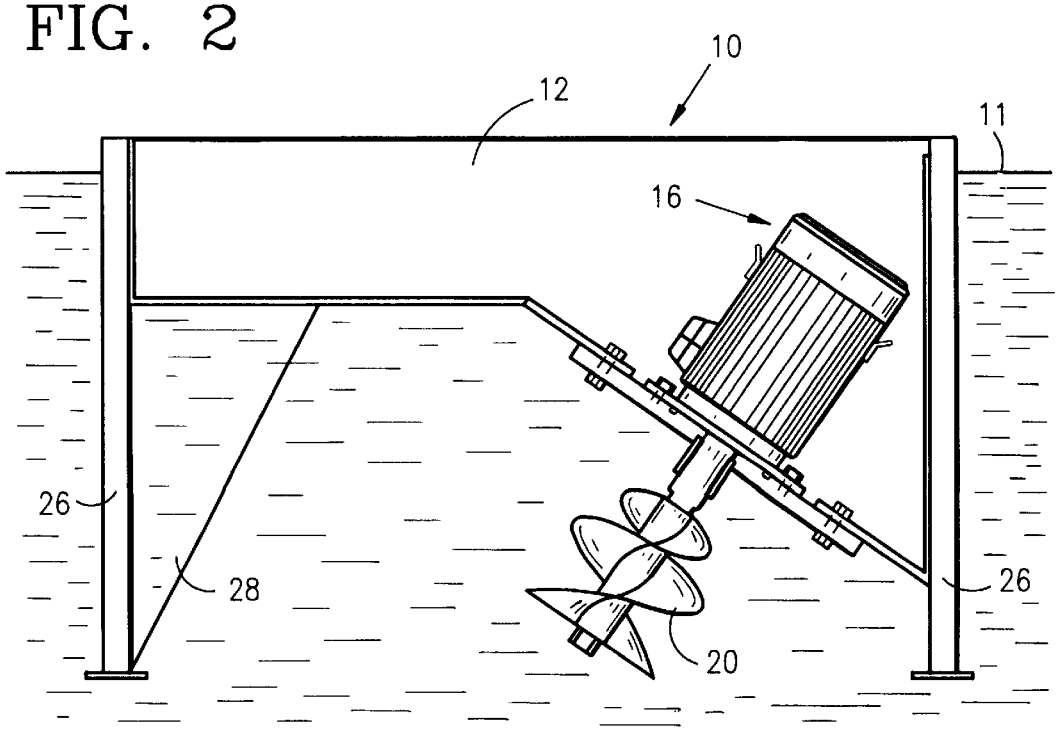
FIG. 2 is a cross section of a mixer with the power source arranged at an angle.

FIG. 2 shows a variant embodiment in which the motor 16 with associated screw-shaped body 20 is arranged at an angle with the water surface 11.

The form of the air chamber 12 is in this case adapted and the motor 16 is eccentrically arranged in the float. The supporting legs 26 and orientation plates 28 may also be fitted in this case.

Figure 3:
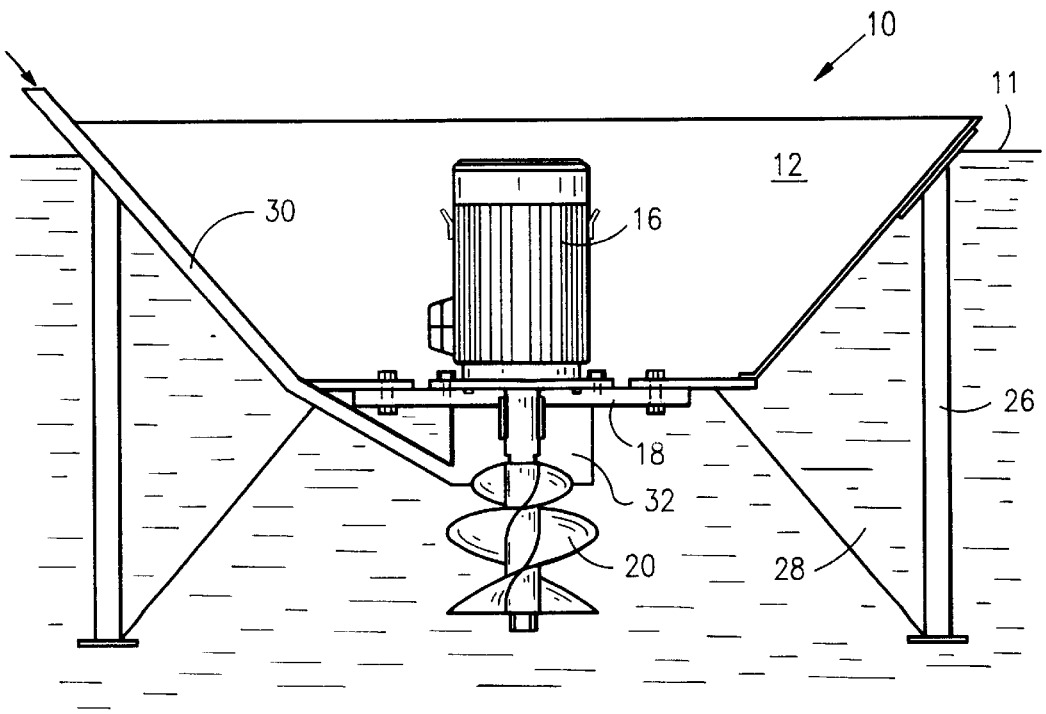
FIG. 3 is a cross section of a combined aerator-mixer according to the invention in which a motor is arranged centrally and vertically.
Figure 4:
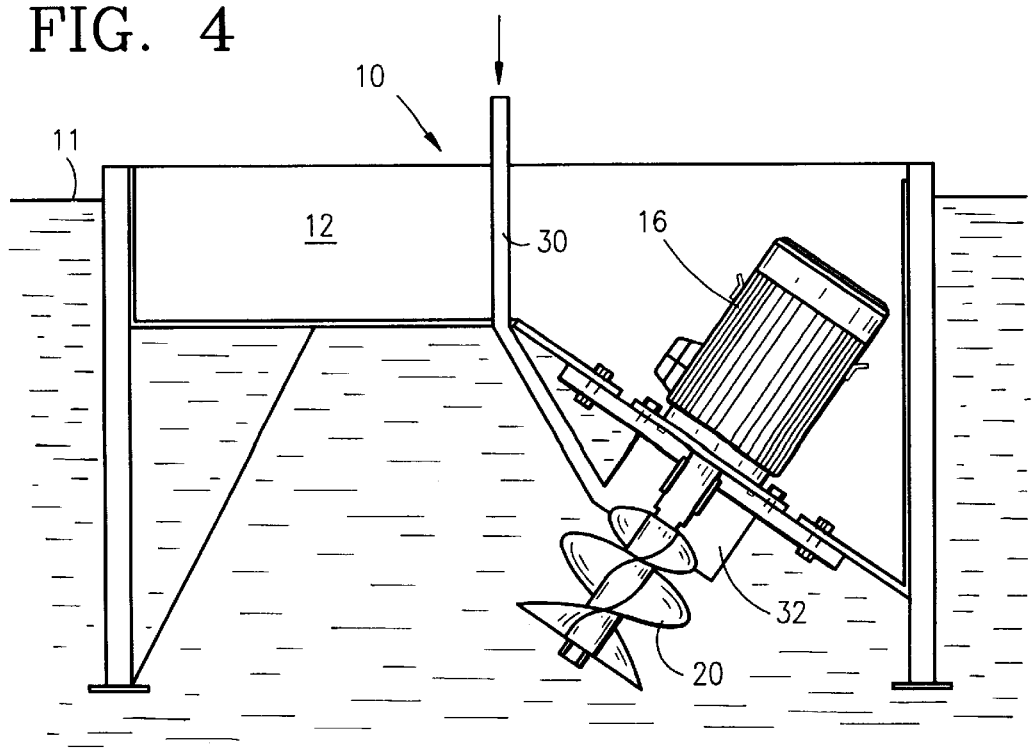
FIG. 4 is a cross section of a combined aerator-mixer with the power source arranged at an angle.

FIGS. 3 and 4 are analogous embodiments of FIGS. 1 and 2 respectively.

Here, however, the apparatus is adapted to serve as a mixer and also, if desired, as an aerator. Apart from the float 10, the motor 16, the screw-shaped body 20, the supporting legs 26 and the orientation plates 28, a conduit 30 is also fitted here via which a gas, such as air, can be drawn from above the water surface 11 into a chamber 32 formed between the flange 18, on which the motor 16 is mounted, and the screw-shaped body 20. Through the motion of the screw 20, the air is drawn out of the chamber 32 and dispersed downwards with the flow of the water. In this way, air bubbles containing oxygen are pushed through the entire mass of waste water, thus promoting oxygen input into the water.

Instead of simply drawing the gas or the air from above the surface of the water by the action of the screw-shaped body 20, the gas or air may also be pumped under pressure to the chamber 32 via conduit 30. The apparatus is thus a combined aerator-mixer. The closure or opening of the air conduit 30 determines whether the apparatus functions as a mixer or as an aerator.

An aerator of the same kind but with the motor 16 arranged at an angle is illustrated in FIG. 4.

Figure 5:
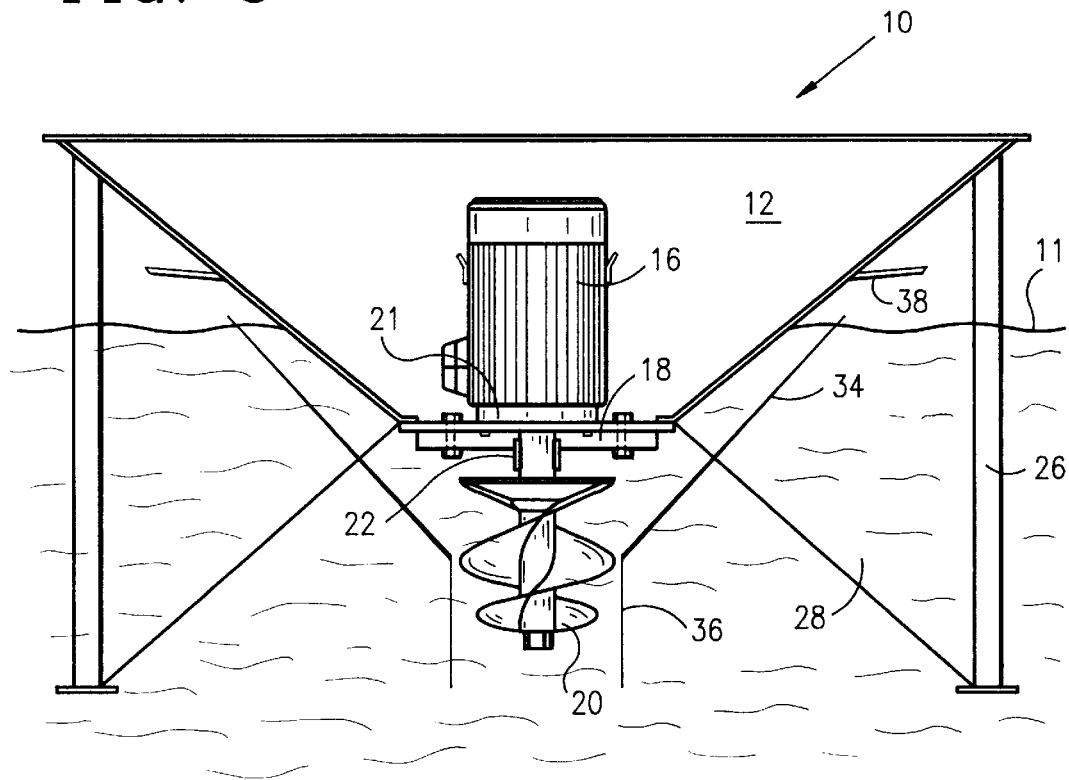
FIG. 5 is a cross section of a surface aerator with a motor arranged vertically.

FIG. 5 shows an aerator in which the float 10 forms a sealed chamber 12 and floats on the water surface 11. The motor 16 is mounted in the same way as in FIG. 1 by means of a flange 18. An oil pan 21 with a seal 22 is located between the motor 16 and the flange 18. The function of the seal 22 remains the same as in the foregoing embodiments.

A screw-shaped impeller device 20, of the type based on impeller technology, as described in the Applicant's aforementioned patents, pushes the water through a pump housing 36 and then through a narrowing opening between the float and the guide plates 34 to the water surface 11. In order to guide the discharge of water to the water surface 11, a deflection plate 38 is mounted around the float 10. The supporting legs 26 and orientation plates 28 fulfil the same function as in the foregoing embodiments.

Figure 6:
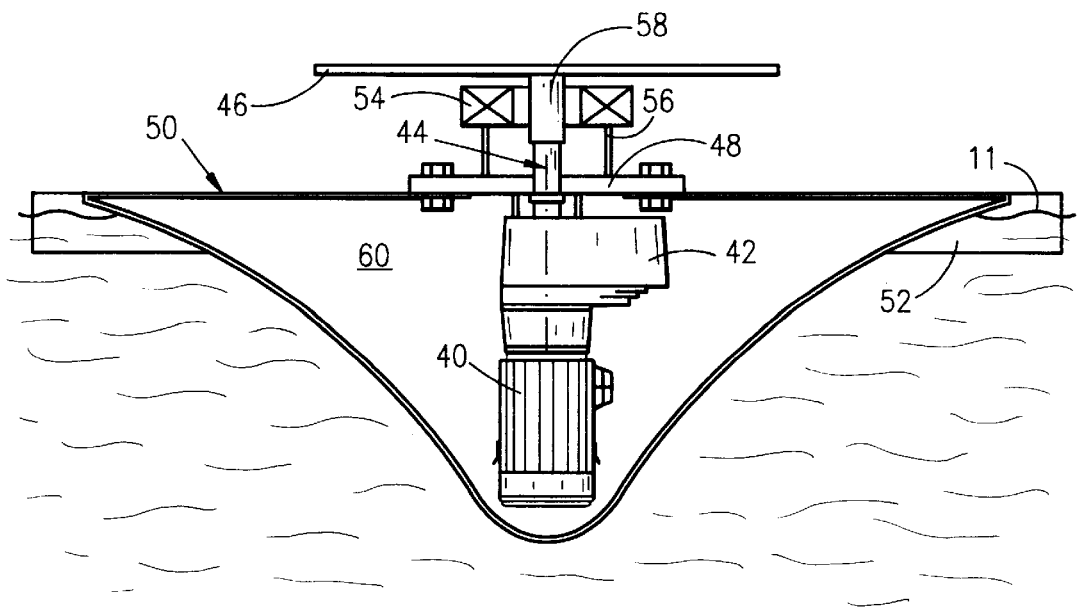
FIG. 6 is a cross section of a surface aerator in which the float acts as an impeller device.

FIG. 6 shows an aerator with a motor 40 and a motor reducer 42, supplied by a slip-ring commutator. The shaft 44 of the motor is permanently arranged and attached to a fixed plate 46 which is permanently connected by cables with the edge of a water basin. The motor is fastened by a flange 48 in the float 50, which forms a sealed chamber 60. The stator of the motor rotates as well; the entire motor and float thus rotate. On the outer circumference, the float is fitted with blades 52 which, through the rotating movement of the float 50, push up and aerate the water, with the float functioning as an impeller device. The slip-ring commutator comprises a part 54 which also rotates that is connected by bars 56 to a flange 48 and a fixed part 58—stationary brushes— connected to the fixed shaft 44.

The advantages associated with the apparatus according to this invention are among others:

effective protection of the motor or power source by the arrangement in a sealed chamber, a more stable unit as a result of a lowered centre of gravity on the one hand and a very large bearing surface of the float on the other;

compact and simpler construction of the unit;

high reliability and a longer useful life for the motor through the avoidance of contact with the liquid (moisture) and through lower loading of the bearings.

The apparatuses described above are only a few examples of embodiments of a mixer and/or aerator according to the invention, but it goes without saying that other embodiments are possible without thereby going beyond the scope of the current patent protection; thus, the apparatus may be used in all types of liquids which, for example, are found in the chemical or food industry; in addition, the impeller device need not be a screw, but the apparatus may be equipped with any form of paddle wheel.

If the surface of the float does not provide adequate cooling for the power source, it is within the scope of a person skilled in the art to add external aids such as cooling fins, cooling by means of a double wall, air extraction, etc.

It may also be advantageous for certain applications to increase the buoyancy by fitting extra floats.

I claim:

1. Apparatus for the treatment of liquids, said apparatus comprising a power source which is mounted on a float and in which the power source drives an impeller device which extends under the liquid surface, wherein said float comprises a closed floating chamber in which the power source is mounted and wherein said floating chamber substantially contributes to the buoyancy of the apparatus and wherein any heat produced by the power source is removed via walls of the chamber to the surrounding liquid.

2. Apparatus according to claim 1 wherein the power source is arranged substantially vertically in the chamber.

3. Apparatus according to claim 1 wherein the power source is arranged in the chamber at an angle to the liquid surface.

4. Apparatus according to claim 1 wherein the power source is a motor which is secured in the chamber by means of a flange, with an oil pan being formed between the flange and the motor, with said oil pan being sealed from the liquid by means of a mechanical seal which is arranged between the flange and a cylindrical part of the impeller device.

5. Apparatus according to claim 1 wherein the float is fitted underneath with plates positioned to give the liquid drawn in and/or pushed away a desired flow or rotation profile.

6. Apparatus according to claim 1 which is fitted with a conduit for supplying gas to the liquid in the vicinity of the impeller device.

7. Apparatus according to claim 6 including means for supplying the gas under pressure.

8. Apparatus according to claim 1 wherein the chamber is provided with additional cooling means.

9. Apparatus according to claim 1 wherein guide plates are installed around the impeller device and around the float in order to guide the liquid during pumping-up and dispersal of the liquid over the liquid surface.

10. Apparatus according to claim 1 wherein the float is fitted with blades which act as the impeller device.

11. Apparatus according to claim 1, wherein the apparatus is fitted with extra floats to increase its buoyancy.

* * * * *